United States Patent
Kawai et al.

(10) Patent No.: US 7,515,199 B2
(45) Date of Patent: Apr. 7, 2009

(54) DETACHABLE LENS APPARATUS, CAMERA SYSTEM AND CAMERA FOR ACCURATE AUTOMATIC FOCUSING USING TWO DRIVING MECHANISMS

(75) Inventors: Tohru Kawai, Kanagawa-ken (JP); Masanori Ishikawa, Saitama-ken (JP); Seiichi Kashiwaba, Tochigi-ken (JP); Mitsuru Shinohara, Yamanashi-ken (JP); Shigeki Sato, Tochigi-ken (JP); Yuki Nagao, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 11/044,833

(22) Filed: Jan. 26, 2005

(65) Prior Publication Data

US 2005/0168622 A1 Aug. 4, 2005

(30) Foreign Application Priority Data

Jan. 30, 2004 (JP) ............... 2004-022742

(51) Int. Cl.
*H04N 5/232* (2006.01)
*G03B 13/00* (2006.01)

(52) U.S. Cl. ............... 348/347; 348/349; 348/351; 348/357

(58) Field of Classification Search ......... 348/349–351, 348/353, 357, 345, 347
See application file for complete search history.

(56) References Cited

U.S. PATENT DOCUMENTS

| 5,392,159 A | * | 2/1995 | Sasaki et al. ............. 359/691 |
| 5,854,948 A | * | 12/1998 | Tsukada ................. 396/93 |
| 5,907,724 A | * | 5/1999 | Uno et al. ............... 396/82 |

FOREIGN PATENT DOCUMENTS

| JP | 9-181954 | | 7/1997 |
| JP | 09181954 A | * | 7/1997 |
| JP | 2687292 | | 8/1997 |
| JP | 2687292 B2 | * | 8/1997 |
| JP | 2003005022 A | * | 1/2003 |

* cited by examiner

*Primary Examiner*—Ngoc-Yen T Vu
(74) *Attorney, Agent, or Firm*—Locke Lord Bissell & Liddell LLP (57) ABSTRACT

Provided are a lens apparatus and an optical apparatus having the same, the lens apparatus including a lens holding member holding a lens, a supporting member for supporting the lens holding member movably in the direction of the optical axis of the lens, a first drive mechanism for moving the supporting member in the direction of the optical axis, and a second drive mechanism for moving the lens holding member in the direction of the optical axis, wherein a focusing lens can be moved to an in-focus position within a short time and highly accurately by an AF system.

8 Claims, 5 Drawing Sheets

DETACHABLE LENS APPARATUS, CAMERA SYSTEM AND CAMERA FOR ACCURATE AUTOMATIC FOCUSING USING TWO DRIVING MECHANISMS

BACKGROUND OF THE INVENTION

1. Field of the Invention

This invention relates to a lens apparatus, a camera system and a camera, and particularly is suitable for an optical apparatus such as, for example, a video camera or a still camera using two drive mechanisms, i.e., a first drive mechanism and a second drive mechanism, as a drive source for driving a focusing lens in the direction of the optical axis thereof, and designed such that the two drive mechanisms are driven independently of each other, whereby high-speed and highly accurate drive control can be effected.

2. Related Background Art

There have heretofore been proposed numerous optical apparatuses (camera systems) carrying thereon an automatic focus adjusting (hereinafter referred to also as "AF") apparatus for detecting the focus adjusted state of a photo-taking lens or the distance to an object, and driving an actuator (drive source) such as a motor on the basis of the result of the detection to thereby drive a focusing lens to an in-focus position.

With the downsizing and high-density pixel integration of digital camera systems in recent years, numerous propositions regarding the higher accuracy of the AF apparatus and the shortening of the AF time have been made (for example, Japanese Patent No. 2687292 and Japanese Patent Application Laid-Open No. H09-181954).

Japanese Patent No. 2687292 discloses an AF apparatus having focus rough adjusting means for adjusting a focusing system lens to thereby effect the rough adjustment of the focus, and wobbling method detecting means for finely vibrating the lens and adjusting the focus thereof by a wobbling method.

Japanese Patent Application Laid-Open No.. H09-181954 discloses a focus controlling method using two means, i.e., focus controlling means by a phase difference detecting process and focus controlling means by a contrast detecting process, and selecting one or two of these means in due order to thereby effect focusing.

The AF apparatus of Japanese Patent No. 2687292 is such that different ones of a plurality of focusing system lenses are driven by different actuators, but for rough adjustment, a first focusing system lens is manually driven, and a second focusing system lens is vibrated by the wobbling method, and the first focusing system lens is driven so as to assume the best focus position.

In the conventional AF apparatus as described above, however, rough adjustment must be manually effected and there is a limitation in the driving accuracy of the focusing system lenses, and there has been the problem that hunting occurs.

The focus controlling method of Japanese Patent Application Laid-Open No. H09-181954 has AF mode changeover means for changing over a one-shot AF mode using both of the focus controlling means by the phase difference detecting process and the focus controlling means by the contrast detecting process in due order, and a servo AF mode using the focus controlling means by the phase difference detecting process.

However, two kinds of controlling methods are used as the focus controlling methods in Japanese Patent Application Laid-Open No. H09-181954, but the focusing lens is single and the actuator (drive source) therefor is also single, and there has been the tendency-that highly accurate AF must be performed within a short time by only these controlling methods.

When as a method of solving this, for example, a high-speed type actuator is used to shorten the focusing time, it is possible to shorten the time for which the focusing lens is driven to the vicinity of the in-focus position, but there has been the tendency that the control during minute driving from the vicinity of the final in-focus position to the in-focus position is not in time and it becomes difficult to accurately stop the focusing lens at the in-focus position.

Also, when conversely, a low-speed type actuator is used with priority given to higher accuracy, it is possible to accurately stop the focusing lens during the minute driving from the vicinity of the in-focus position to the in-focus position, but the driving time to the vicinity of the in-focus position has tended to become long.

SUMMARY OF THE INVENTION

It is an object of the present invention to provide a lens driving apparatus which can move a focusing lens to an in-focus position highly accurately within a short time by an AF system, and an optical apparatus having the same.

Particularly, it is an-object of the present invention to provide a lens driving apparatus which uses first driving means for rough adjustment and second driving means for fine adjustment as a drive source for driving a focusing lens in the direction of the optical axis thereof, and in which the first driving means and the second driving means can be driven independently of each other to thereby effect high-speed and moreover highly accurate drive control, and an optical apparatus having the same.

According to one aspect of the invention, a lens apparatus has a lens holding member holding a lens, a supporting member for supporting the lens holding member movably in the direction of the optical axis of the lens, a first drive mechanism for moving the supporting member in the direction of the optical axis, and a second drive mechanism for driving the lens holding member in the direction of the optical axis.

According to another aspect of the invention, a lens apparatus for use in a camera system includes the lens apparatus having a focusing lens, and a camera for detachably mounting the lens apparatus thereon, and having a focus state detector for detecting the focus state of an image obtained by the optical system, the lens apparatus having: a lens holding member holding the focusing lens; a supporting member for supporting the lens holding member movably in the direction of the optical axis of the optical system; a first drive mechanism for moving the supporting member in the direction of the optical axis of the optical system; a second drive mechanism for moving the lens holding member in the direction of the optical axis; and a controller for controlling the first drive mechanism and the second drive mechanism on the basis of the result of the detection by the focus state detector; in which the controller, on the basis of the result of the detection by the focus state detector, moves the lens holding member toward a predetermined position in the supporting member by the second drive mechanism, and with the drive amount added, moves the supporting member in the direction of the optical axis by the first drive mechanism, and thereafter moves the lens holding member in the direction of the optical axis by the second drive mechanism, and wherein the controller holds the lens holding member at the predetermined position in the supporting member by the second drive mechanism, detects the focus state by the focus state detector and moves the supporting member in the direction of the optical axis on the basis of the result of the detection by the first drive mechanism until a defocus amount comes within a first focus range, and thereafter again detects the focus state by the focus state detector and moves the lens holding member in the direction of the optical axis by the second drive mechanism on the basis of the result of the detection until the defocus amount comes within a second focus range.

According to still another aspect of the invention, a camera system includes a lens apparatus including an optical system having a focusing lens, and a camera detachably mounting the lens apparatus thereon, the camera system having: a lens holding member holding the focusing lens; a supporting member for supporting the lens holding member movably in the direction of the optical axis of the optical system; a first drive mechanism for moving the supporting member in the direction of the optical axis of the optical system; a second drive mechanism for moving the lens holding member in the direction of the optical axis; a focus state detector for detecting the focus state of an image obtained by the optical system; and a controller for controlling the first drive mechanism and the second drive mechanism on the basis of the result of the detection by the focus state detector.

According to still another aspect of the invention, a lens apparatus for use in a camera system includes the lens apparatus including an optical system having a focusing lens, and a camera detachably mounting the lens apparatus thereon, and having a first focus state detector for detecting the focus state of an image obtained by the optical system, and a second focus state detector having detection accuracy higher than the detection accuracy of the first focus state detector, the lens apparatus having: a lens holding member holding the focusing lens; a supporting member for supporting the lens holding member for movement in the direction of the optical axis of the optical system; a first drive mechanism for moving the supporting member in the direction of the optical axis of the optical system; a second drive mechanism for moving the lens holding member in the direction of the optical axis; and a controller for controlling the first drive mechanism and the second drive mechanism on the basis of the results of the detection by the first focus state detector and the second focus state detector; wherein the controller holds the lens holding member at a predetermined position in the supporting member by the second drive mechanism, and detects the focus state by the first focus state detector and moves the supporting member in the direction of the optical axis by the first drive mechanism on the basis of the result of the detection until a defocus amount comes within a first focus range, and thereafter detects the focus state by the second focus state detector and moves the lens holding member in the direction of the optical axis by the second drive mechanism on the basis of the result of the detection until the defocus amount comes within a second focus range.

According to still another aspect of the invention, a camera system includes a lens apparatus including an optical system having a focusing lens, and a camera detachably mounting the lens apparatus thereon, the camera system having: a lens holding member holding the focusing lens; a supporting member for supporting the lens holding member movably in the direction of the optical axis of the optical system; a first drive mechanism for moving the supporting member in the direction of the optical axis of the optical system; a second drive mechanism for moving the lens holding member in the direction of the optical axis; a first focus state detector for detecting the focus state of an image obtained by said optical system; a second focus state detector for detecting the focus state of the image obtained by said optical system, the detection accuracy of said second focus state detector being higher (finer) than the detection accuracy of the first focus state detector; and a controller for controlling the first drive mechanism and the second drive mechanism on the basis of the results of the detection by the first focus state detector and the second focus state detector.

Further features of the present invention will become apparent from the following description of some specific embodiment of the invention taken in conjunction with the accompanying drawings.

DESCRIPTION OF THE PREFERRED EMBODIMENTS

Some embodiments of the present invention will hereinafter be described with reference to the drawings.

First Embodiment

Figure 1:
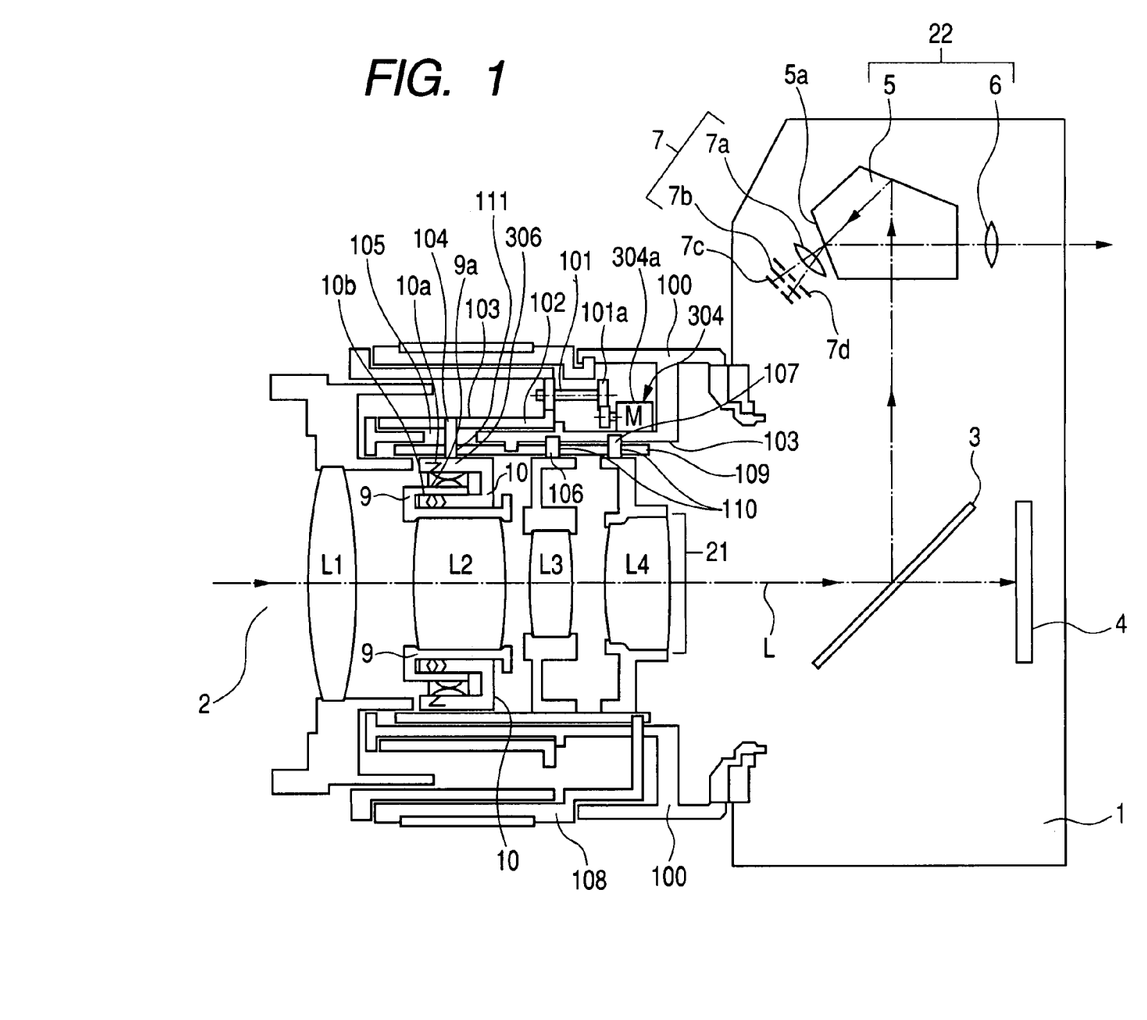
FIG. 1 is a cross-sectional view of the essential portions of a first embodiment of the present invention.

FIG. 1 is a cross-sectional view of the essential portions of a first embodiment when the lens apparatus of the present invention is applied to a digital single-lens reflex camera (camera system) of a lens interchangable type.

In FIG. 1, the reference numeral 1 designates a camera main body, and the reference numeral 2 denotes an interchangeable lens mounted on the camera main body 1. The camera main body 1 and the interchangeable lens 2 comprise constituent portions shown below.

The reference numeral 21 designates a photo-taking optical system having first, second, third and fourth lens units L1, L2, L3 and L4. The reference numeral 3 denotes a half-transmitting half-mirror (main mirror) disposed on the optical axis L of the photo-taking optical system 21, and this half-mirror 3 transmits therethrough part of beam based on an object image passed through the photo-taking optical system 21 and directs it to an image pickup element 4, and reflects part of the beam and directs it to a viewfinder optical system 22 before the start of photographing, and is retracted from the optical axis L during photographing.

The image pickup element 4 is comprised, for example, of a charge coupled device (CCD) or the like, and is used during photographing as an image pickup element on which the beam based on the object image passed through the photo-taking optical system is imaged and which photoelectrically converts the formed object image, and before photographing, introduces part of the beam passed through the half-mirror 3 as shown in a second embodiment which will be described later, and is used also as a second focus state detector of a contrast type.

The reference numeral 5 denotes a penta prism. In the present embodiment, part of the beam based on the object image which has entered the penta prism 5 is directed to a focus state detector 7.

The focus state detector 7 detects the focus state of the image formed by the photo-taking optical system 21. In the focus state detector 7, the beams splitted by and emerging from the half-mirror surface 5a of the penta prism 5 are condensed by a condenser lens 7a. Then each of the beam passes through a mask 7d having two openings and is formed an object image on a pair of line sensors 7c such as CCD's by a pair of separator lenses (secondary imaging lenses) 7b. That is, the focus state detector 7 has a pair of separator lenses 7b for re-imaging the two beams passed through the mask 7d, and a pair of line sensors 7c for photoelectrically converting the re-imaged object images. The focus state detector 7 in the present embodiment is of a so-called phase difference type which detects a defocus amount, which is the amount of deviation of the focus of the photo-taking optical system, from the deviation of the object images re-imaged on the surfaces of the pair of line sensors 7c.

The reference numeral 6 designates an eyepiece which is an optical system for observing therethrough the aerial images of the object images by the photo-taking optical system 21. Each of the penta prism 5 and the eyepiece 6 constitutes an element of the viewfinder system 22.

The second lens unit L2 is a focusing lens for focus detection, and receives a focusing command from a lens CPU (shown in FIG. 2) and is moved on the optical axis thereof by a first drive mechanism 304 or a second drive mechanism 306 which will be described later.

The reference numeral 9 denotes a lens barrel (lens holding member) holding the focusing lens L2.

The reference numeral 10 designates a barrel holding frame (supporting member) constituted by a magnet, and it supports the lens barrel 9 in a manner movable in the direction of the optical axis.

The first drive mechanism 304 drives the barrel holding frame 10, and is provided in a fixed cylinder 100. The first drive mechanism 304 has a DC motor (or a vibration type motor, a stepping motor or the like) 304a and an incremental encoder (not shown) for detecting the amount of rotation thereof, and a gear 101a or the like is fitted on the output shaft of the DC motor 304a and a reduction gear line (connecting gear) 101 is connected thereto.

The second drive mechanism 306 drives the lens barrel 9, and has a voice coil motor and an absolute encoder (not shown) for detecting the amount of movement thereof, and is constituted by permanent magnets 10a and 10b provided integrally with the barrel holding frame 10, and a coil 9a provided integrally with the lens barrel 9, and is relatively movable directly in the direction of the optical axis by the coil 9a being electrically energized.

Each of the first drive mechanism 304 and the second drive mechanism 306 constitutes an element of a lens driving mechanism.

The focusing lens L2 in the present embodiment is designed in construction to be driven by any one of the first drive mechanism 304 having the DC motor 304a and the second drive mechanism 306 having the voice coil motor. However, particularly the driving range of the focusing lens L2 by the voice coil motor (the second drive mechanism 306) is adapted to be limited so as not to interfere with the other lens units, and the driving range is adapted to change in conformity with a zoom position. Specifically, as shown in the flow chart of FIG. 3 which will be described later, design is made such that before the focusing lens L2 is driven, whether the second drive mechanism 306 is at a predetermined position is confirmed without fail, and if it is not at the predetermined position, it is driven to the predetermined position without fail. Further, design is made such that still after the second drive mechanism 306 has been driven from the predetermined position, whether it is within a predetermined range conforming to zoom is confirmed, and if it is outside the predetermined range, it is driven to the predetermined position without fail, and then the focusing lens L2 is driven by the first drive mechanism 304.

In the present embodiment, when the DC motor 304a of the first drive mechanism 304 drives, a focus actuating member 102 is rotated through the connecting gear 101. The focus actuating member 102 is formed with a rectilinear groove 103, in which a focusing pin 104 is fitted. The focusing pin 104 is studded on the barrel holding frame 10 of the second drive mechanism 306 through an escape portion 105 provided on the fixed cylinder 100. Also, a pin 106 studded on the frame of the third lens unit L3, and a pin 107 studded on the frame of the fourth lens unit L4 are fitted in the rectilinear groove 103. A cam ring 109 is connected to a zoom operating ring 108, and the cam ring 109 is formed with cam slots 110 and 111. The cam slot 111 is a cam slot for focusing and zooming.

In the present embodiment, when the DC motor 304a drives, the focus actuating member 102 is rotated through the connecting gear 101, and the barrel holding frame 10 drives through the focusing pin 104 and the focusing lens L2 is moved on the optical axis through the lens barrel 9. Also, when the voice coil motor (second drive mechanism 306) drives, the lens barrel 9 is driven and the focusing lens L2 is moved on the optical axis. Also, when the zoom operating ring 108 is rotated, the cam ring 109 is rotated and the second, third and fourth lens units L2, L3 and L4 are moved on the optical axis through the pins 104, 106 and 107 engaged with the cam slots 111 and 110 formed in the cam ring 109. Thereby, zooming is effected.

Figure 2:
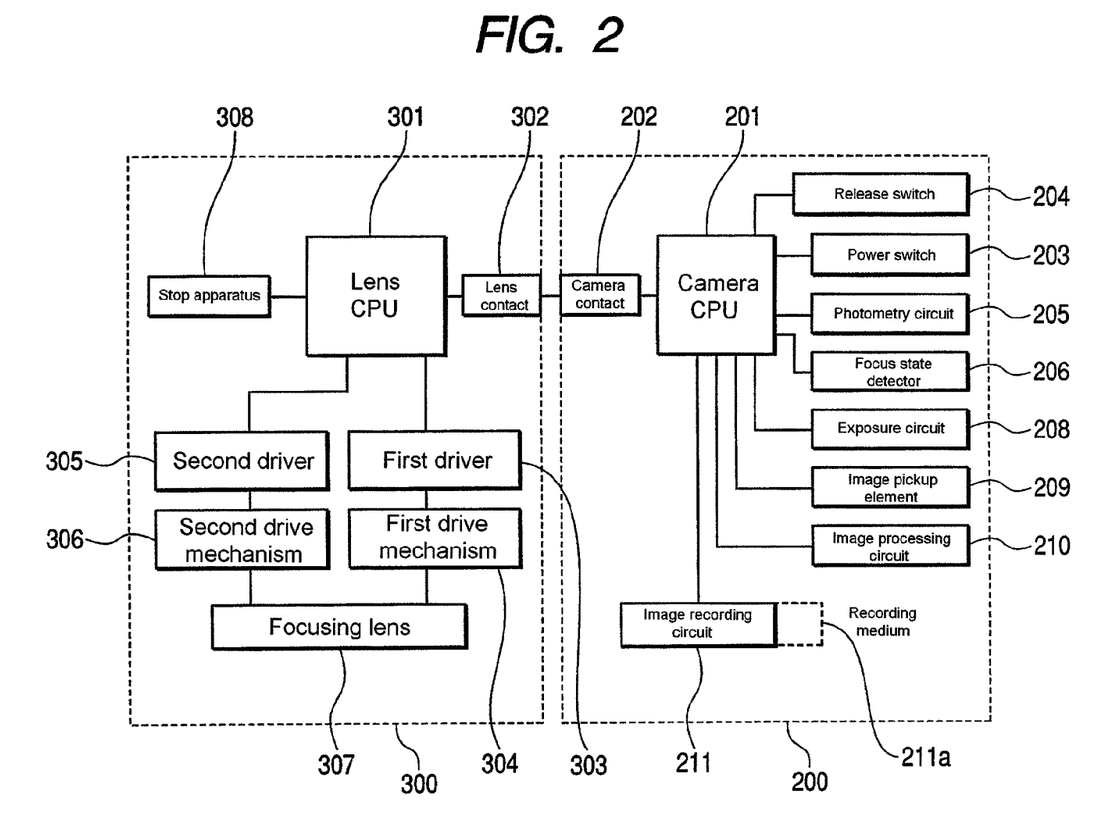
FIG. 2 is a block diagram of the first embodiment of the present invention.

FIG. 2 is a block diagram of a digital single-lens reflex camera (camera system) of a lens interchangeable type according to the present invention.

In FIG. 2, the reference numeral 200 designates a digital camera main body (camera), and the reference numeral 300 denotes an interchangeable lens main body (lens apparatus).

The reference numeral 201 designates a camera CPU constituted by a microcomputer, and it controls the operations of various apparatuses in the camera main body 200, and effects transmission and reception with the lens CPU 301 through a camera contact 202 during the interchangeable lens main body 300 being mounted. The camera contact 202 comprises a signal transmitting contact for transmitting a signal to the lens side, and a contact for a power source for supplying the power source to the lens side.

The reference numeral 203 denotes an extraneously operable power source switch, and it is a switch for starting the camera CPU 201 to thereby make the power source supply to each actuator and a sensor or the like in the system and the operation of the system possible.

The reference numeral 204 designates an extraneously operable release switch of a two-step stroke type, and the signal thereof is inputted to the camera CPU 201. The camera CPU 201 determines an exposure amount by a photometry circuit 205 in accordance with the signal inputted from the release switch 204 if a first stroke switch (SW1) is ON. Focus detection is effected by a focus state detector 206 using a phase difference process, and the camera CPU 201 controls the drive mechanisms in the lens based on the output of the focus state detector 206 and performs a focusing operation and enters a photographing preparing state.

When it is detected that a second stroke switch (SW2) has been operated to ON, a stop operation command is transmitted to a lens CPU 301 in the interchangeable lens main body 300 (which controls the operations of various apparatuses in the interchangeable lens main body 300, and when mounted on the camera main body 200, effects communication with the camera CPU 201 through a lens contact 302), and an exposure starting command is transmitted to an exposure circuit 208, and the object image passed through the photo-taking optical system comprising the lens units in the interchangeable lens main body and imaged on an image pickup element 209 is photoelectrically converted by the image pickup element 209, and an image signal is outputted.

In an image processing circuit 210, the image signal is digitized and compressed, and by an image recording circuit 211, the image signal is recorded and preserved in a recording medium 211a such as a semiconductor memory such as a flash memory, a magnetic disc or an optical disc.

The reference numeral 302 denotes a lens contact comprising a signal transmitting contact to which a signal is transmitted from the camera main body 200 side, and a contact for a power source to which the power source is supplied from the camera main body 200 side.

The reference numeral 303 designates a first drive controlling circuit (driver), and the reference numeral 305 denotes a second drive controlling circuit (driver), and these are selected by the lens CPU 301 in accordance with the flow chart of FIG. 3 which will be described later.

The reference numeral 304 denotes the above-described first drive mechanism having the DC motor 304a and the incremental encoder (not shown) for detecting the amount of rotation thereof, and the gear 101a or the like is fitted to the output shaft of the DC motor 304a and the reduction gear line 101 is connected, and the first drive mechanism is drive-controlled by the first drive controlling circuit 303.

The reference numeral 306 designates the above-described second drive mechanism having the voice coil motor and the absolute encoder (not shown) for detecting the amount of movement thereof, and the second drive mechanism is constituted by the permanent magnets 10a and 10b provided integrally with the barrel holding frame 10, and the coil 9a provided integrally with the lens barrel 9, and is relatively directly movable by the coil 9a being electrically energized, and is drive-controlled by the second drive controlling circuit 305.

In the present embodiment, design is made such that rough focus detection is independently effected by the first drive mechanism 304 having the DC motor 304a, and fine focus detection is independently effected by the second drive mechanism 306 having the voice coil motor.

The reference numeral 307 denotes the focusing lens (L2 shown in FIG. 1), and as described above, it is designed in construction to be driven by any one of the first drive mechanism 304 having the DC motor 304a and the second drive mechanism 306 having the voice coil motor.

The reference numeral 308 designates the stop apparatus which, as previously described, is driven by the lens CPU 301 in accordance with the stop operation command transmitted from the camera CPU 201 and determines the aperture area of the beam passing through the photo-taking optical system.

In the present embodiment, in the above-described configuration, the focus state is detected by the focus state detector 206 using the phase difference process, in accordance with the flow chart shown in FIG. 3 which will be described later in connection with the camera CPU 201, and if the defocus amount is outside a first focus range, DC motor 304a in the first drive mechanism 304 is rotated at a high speed to thereby drive the focusing lens L2 until the defocus amount becomes a defocus amount within the first focus range. Thereafter, the focus state is detected again by the focus state detector 206, and if the defocus amount is within the first focus range and outside a second focus range, the focusing lens L2 is driven by the second drive mechanism 306 (voice coil motor), and is thus driven to a position in which the defocus amount comes within the second focus range, and a highly accurate focusing operation is performed.

That is, in the present embodiment, design is made such that as a drive source for driving the focusing lens L2 in the optical axis direction, use is made of the first drive mechanism 304 for rough adjustment and the second drive mechanism 306 for fine adjustment, and they are driven independently of each other, whereby high-speed and highly accurate drive control can be performed.

In the present embodiment, when the defocus amount is small and is within the first focus range from the beginning, the driving by the first drive mechanism 304 (DC motor 304a) is omitted, and the focusing operation of the focusing lens L2 is performed to a position within the second focus range by the second drive mechanism 306 (voice coil motor).

Figure 3:
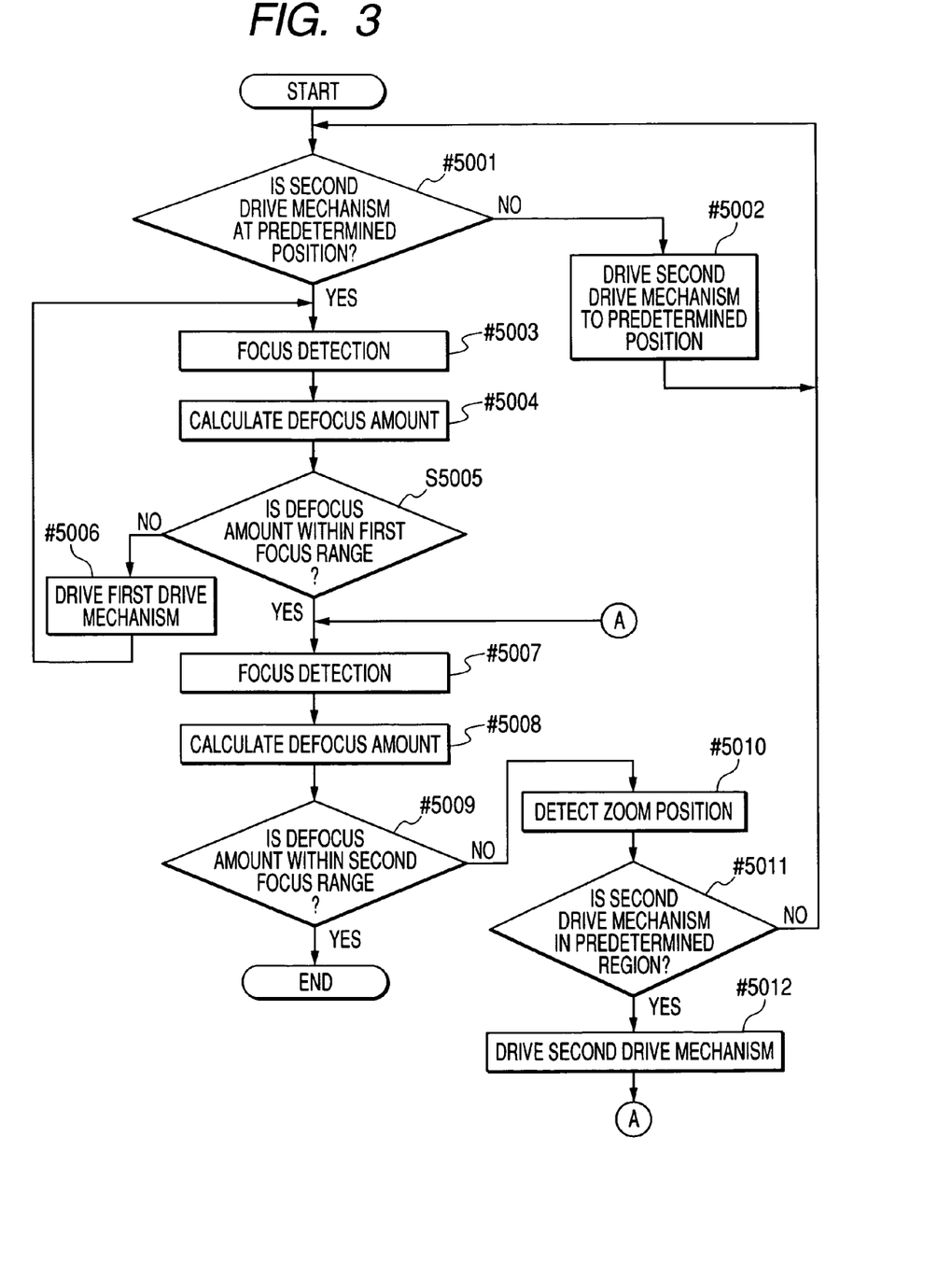
FIG. 3 is a flow chart of the first embodiment of the present invention.

FIG. 3 is a flow chart showing the main operations of focus adjustment in the system shown in FIG. 2.

Description will first be made from the time when the camera CPU 201 starts the focusing operation in accordance with the SW1 signal of the release switch 204.

First, at #5001, whether the lens barrel 9 of the second drive mechanism 306 is located at a predetermined position in the barrel holding frame 10 is discriminated, and if it is not located at the predetermined position, the second drive mechanism 306 is driven to the predetermined position at #5002. Returned to #5001, confirmation is made again. If the lens barrel 9 is at the predetermined position, the focus state is detected by the focus state detector 206 using the phase difference process at #5003, and the defocus amount is calculated at #5004. At #5005, whether the defocus amount is within the first focus range is discriminated, and if the defocus amount is outside the first focus range, advance is made to #5006, and if the defocus amount is within the first focus range, advance is made to #5007.

At #5006, the first drive controlling circuit 303 is selected by the lens CPU 301, and DC motor 304a in the first drive control mechanism 304 is rotated at a high speed so as to drive the focusing lens L2. Then, returned to #5003, where focus detection is effected again, and the defocus amount is calculated at #5004, and whether the defocus amount is within the first focus range is checked again at #5005. If the defocus amount is outside the first focus range, advanced to #5006, the previous operation is repeated.

If, at #5005, the defocus amount is within the first focus range, the focus state is again checked by the focus state detector 206 using the phase difference process at #5007, then the defocus amount is calculated at #5008, whereafter advance is made to #5009.

At #5009, whether the defocus amount is within the second focus range is discriminated, and if the defocus amount is outside the second focus range, the zoom position is detected at #5010, and advance is made to #5011. At #5011, whether the second drive mechanism 306 is within a predetermined range conforming to the zoom is discriminated. If it is outside the predetermined range, return is made to #5001, where the above-described flow is repeated. If it is-within the predetermined range, advance is made to #5012, where the second drive mechanism 306 is driven, and return is made to #5007, where focus detection is effected again, and at #5008, the defocus amount is calculated, and at #5009, discrimination as to whether the defocus amount is within the second focus range is repeated.

If at #5009, the defocus amount comes within the second focus range, focus adjustment is ended.

In the present embodiment, as described above, the driving range of the second drive mechanism 306 (voice coil motor)

is determined by an electrical regulation range of the magnets and the coil, and a range exceeding that driving range is determined by a mechanical regulation range of the engagement between the lens barrel 9 and the barrel holding frame 10. Also, the driving range of the second drive mechanism 306 determined by the electrical regulation range changes in conformity with the photographing distance or/and the focal length.

Also, when a driving command is generated beyond the driving range of the second drive mechanism 306 determined by the electrical regulation range, the first drive mechanism 304 (DC motor 304a) is driven with the lens barrel 9 driven to the predetermined position of the barrel holding frame 10 by the second drive mechanism 306 and held at the position, and after the stoppage thereof, the lens barrel 9 is driven by the second drive mechanism 306. The second drive mechanism 306 and the lens barrel 9 are disposed on the barrel holding frame 10.

The present embodiment, as described above, has the first and second drive mechanisms 304 and 306 which focus the focusing lens L2, and is designed such that the focusing lens L2 is driven to within the first focus range by the first drive mechanism 304, and is driven to within the second focus range by the second drive mechanism 306. Thereby, the focusing lens is driven to the vicinity of in-focus at a high speed, whereafter highly )accurate driving for fine adjustment can be effected, and smooth, high-speed and moreover highly accurate focus adjustment can be accomplished.

In the above-described embodiment, when a driving command is generated beyond the driving range of the second drive mechanism 306 determined by the electrical regulation range, there may be adopted such control that the lens barrel 9 is driven toward the predetermined position of the barrel holding frame 10 by the second drive mechanism 306 and also, with the driving amount added, the first drive mechanism 304 (DC motor 304a) is driven, and after the stoppage thereof, the lens barrel 9 is driven by the second drive mechanism 306.

While, in the present embodiment, the phase difference process is used as the focus state detecting process, this is not restrictive, but use may be made of other focus detecting process such as an active process. Also, while in the present embodiment, the focus state detecting portion is provided in the upper portion (the penta prism side) of the camera main body, this is not restrictive, but the focus state detecting portion may be provided in the lower portion of the camera main body. In this case, a sub-mirror can be provided on the rear of the half-mirror, and a beam based on an object image reflected by this sub-mirror can be directed to the focus state detector.

Second Embodiment

Figure 4:
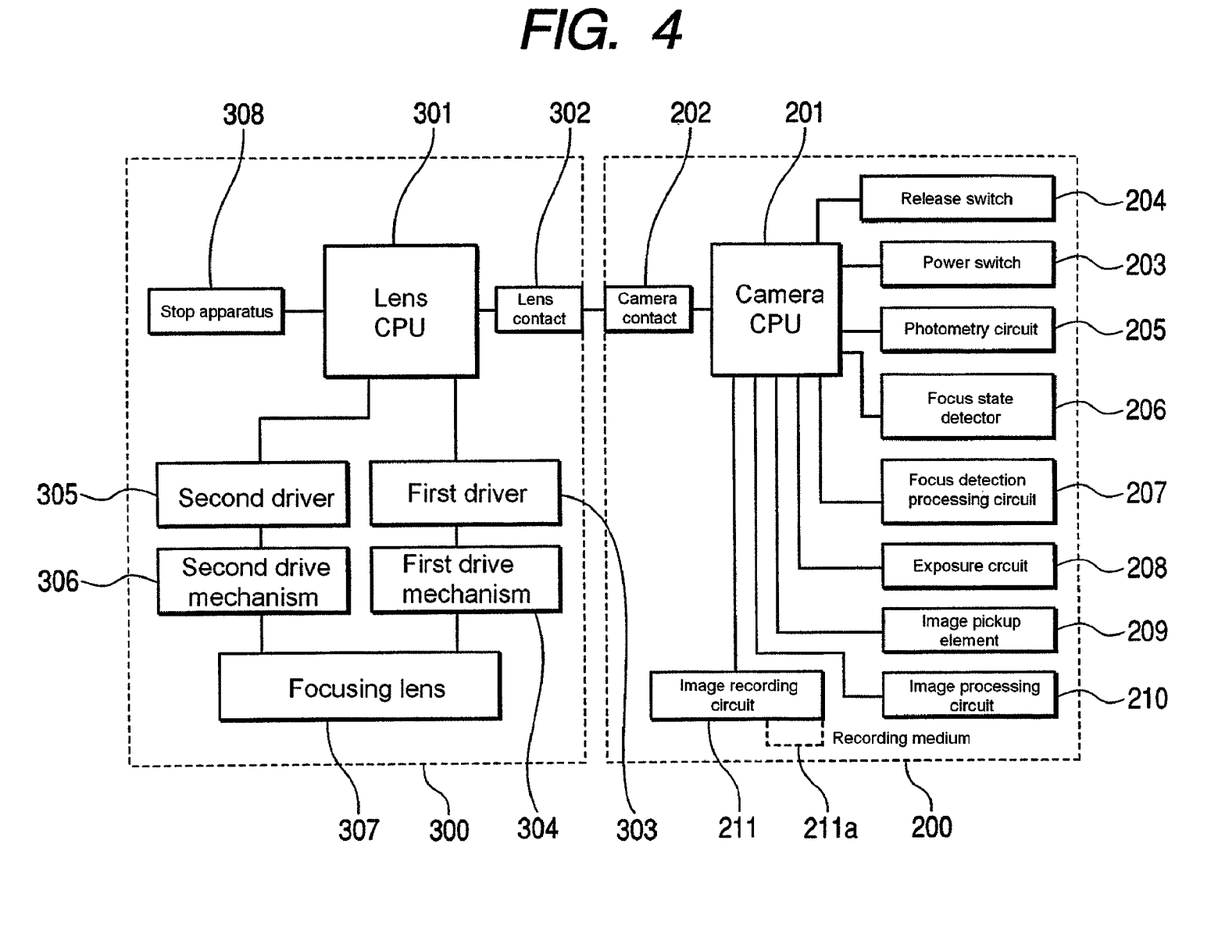
FIG. 4 is a block diagram of a second embodiment of the present invention.

FIG. 4 is a block diagram of a digital single-lens reflex camera (camera system) of a lens interchangeable type according to a second embodiment of the present invention. In FIG. 4, the same elements as the elements shown in FIG. 2 are given the same reference characters.

The difference of the present embodiment from the aforedescribed first embodiment resides in a construction having, as the focus state detector, two focus detecting units, i.e., a first focus state detector 206 using the phase difference process, and a second focus state detecting unit using a contrast process using the image pickup element 209 and the focus detection processing circuit 207. In the other points, the construction and optical action of the present embodiment are substantially similar to those of the first embodiment, whereby a similar effect is obtained.

That is, in the present embodiment, in the above-described construction, focus detection is effected by the first focus state, detector 206 using the phase difference process, in accordance with a flow chart which will be described later in connection with the camera CPU 201, if the defocus amount is outside the first focus range, DC motor 304a in the first drive mechanism 304 is rotated at a high speed so as to drive the focusing lens L2 until the defocus amount becomes a defocus amount within the first focus range. Thereafter, switched to the second focus state detecting unit (the image pickup element 209 and the focus detection processing circuit 207) using the contrast process so that focus detection is effected, if the defocus amount is outside the second focus range, the focusing lens L2 is driven to a position in which the contrast within the second focus range becomes maximum by the second drive mechanism (voice coil motor) 306, and a highly accurate focusing operation is performed.

When, as in the first embodiment, the defocus amount is small and is within the first focus range from the beginning, the driving by the first driving means (DC motor) 304 is omitted, and the focusing operation of the focusing lens L2 is performed to the position within the second focus range by the second driving means (voice coil motor) 306.

Figure 5:
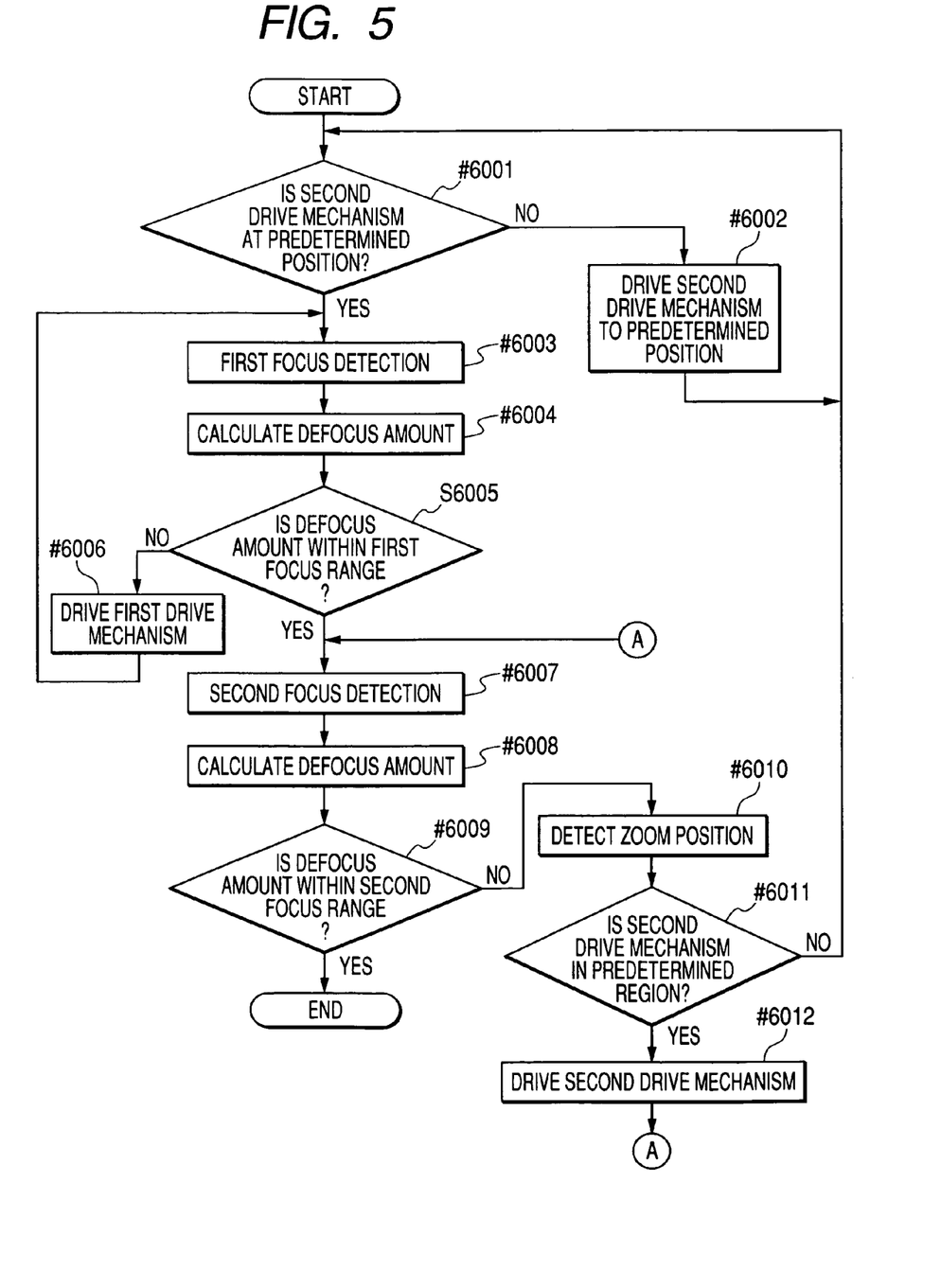
FIG. 5 is a flow chart of the second embodiment of the present invention.

FIG. 5 is a flow chart showing the main operations of focus adjustment in the camera system shown in FIG. 4.

The flow chart of FIG. 5, as compared with the flow chart shown in FIG. 3 (first embodiment), differs only in that the second focus detecting unit (the image pickup element 209 and the focus detection processing circuit 207) at #6007 (in FIG. 3, #5007) has been changed from the phase difference type to the contrast type, and the other flows are similar to those in the first embodiment and therefore need not be described here.

Thus, the present embodiment, as described above, has the two focus detecting units, i.e., the first and second focus detecting units 206 and 207, and the two drive mechanisms, i.e., the first and second drive mechanisms 304 and 306 for focusing the focusing lens L2, and is designed such that the focusing lens is driven to within the first focus range by the first focus state detector using the phase difference process by the first drive mechanism 304, and is driven to within the second focus range by the second focus state detecting unit (the image pickup element 209 and the focus detection processing circuit 207) using the contrast process by the second drive mechanism 306, whereby the focusing lens is driven to the vicinity of in-focus at a high speed, whereafter highly accurate driving for fine adjustment is effected, whereby smooth, high-speed and moreover highly accurate focus adjustment can be accomplished.

While in each of the above-described embodiments, a DC motor is adopted in the first drive mechanism 304 and a voice coil motor is adopted in the second drive mechanism 306, but these are not restrictive, but they may be, for example, vibration type motors (ultrasonic motors), stepping motors or the like.

According to the above-described embodiment, a lens apparatus is configured to include the first and second drive mechanisms for focusing the lens, and design is made such that the lens is driven to within the first focus range by the first drive mechanism, and is driven to within the second focus range by the second drive mechanism, whereafter highly accurate driving for fine adjustment is effected, whereby smooth, high-speed and moreover highly accurate focus adjustment can be accomplished.

Also, according to the above-described embodiment, a lens apparatus is configured to include the first and second focus state detecting units and the first and second drive mechanisms for focusing the lens, and design is made such that the lens is driven to within the first focus range by the first focus state detecting unit by the first drive mechanism, and is driven to within the second focus range by the second focus state detecting unit by the second drive mechanism, whereby the lens is driven to the vicinity of in-focus at a high speed, whereafter highly accurate driving for fine adjustment is effected, whereby smooth, high-speed and moreover highly accurate focus adjustment can be accomplished.

This application claims priority from Japanese Patent Application No. 2004-022742 filed Jan. 30, 2004, which is hereby incorporated by reference herein.

What is claimed is:

1. A lens apparatus for use in a camera system including the lens apparatus including an optical system having a focusing lens, and a camera detachably mounting the lens apparatus thereon, and having a focus state detector for detecting a focus state of an image obtained by the optical system, the lens apparatus including:

a lens holding member holding the focusing lens;

a supporting member for supporting the lens holding member movably in the direction of an optical axis of the optical system;

a first drive mechanism for moving the supporting member in the direction of the optical axis of the optical system;

a second drive mechanism for moving the lens holding member in the direction of the optical axis; and a controller for controlling the first drive mechanism and the second drive mechanism on the basis of a result of detection by the focus state detector;

wherein the driving accuracy of said second drive mechanism is higher than the driving accuracy of said first drive mechanism, the driving range of said first drive mechanism is greater than the driving range of said second drive mechanism; and wherein if said lens holding member is not at a predetermined position in said supporting member, said controller moves said lens holding member to the predetermined position in said supporting member by said second drive mechanism, detects focus state by said focus state detector and moves the supporting member in the direction of said optical axis by said first drive mechanism on the basis of the result of the detection until a defocus amount comes within a first focus range, and thereafter again detects focus state by the focus state detector and moves the lens holding member in the direction of the optical axis by said second drive mechanism on the basis of the result of the detection until the defocus amount comes within a second focus range.

2. A lens apparatus according to claim 1 wherein the optical system has a single focusing lens.

3. A camera system including a lens apparatus including an optical system having a focusing lens, and a camera detachably mounting the lens apparatus thereon, the camera system comprising:

a lens holding member holding the focusing lens;

a supporting member for supporting the lens holding member movably in the direction of an optical axis of the optical system;

a first drive mechanism for moving the supporting member in the direction of the optical axis of the optical system;

a second drive mechanism for moving the lens holding member in the direction of the optical axis;

a focus state detector for detecting a focus state of an image obtained by the optical system; and a controller for controlling the first drive mechanism and the second drive mechanism on the basis of a result of detection by the focus state detector;

wherein the driving accuracy of said second drive mechanism is higher than the driving accuracy of said first drive mechanism, the driving range of said first drive mechanism is greater than the driving range of said second drive mechanism; and wherein if said lens holding member is not at a predetermined position in said supporting member, said controller moves said lens holding member to the predetermined position in said supporting member by said second drive mechanism, detects focus state by said focus state detector and moves the supporting member in the direction of said optical axis by said first drive mechanism on the basis of the result of the detection until a defocus amount comes within a first focus range, and thereafter again detects focus state by the focus state detector and moves the lens holding member in the direction of the optical axis by said second drive mechanism on the basis of the result of the detection until the defocus amount comes within a second focus range.

4. A camera system according to claim 3 wherein the optical system has a single focusing lens.

5. A lens apparatus for use in a camera system including the lens apparatus including an optical system having a focusing lens, and a camera detachably mounting the lens apparatus thereon, and having a first focus state detector for detecting a focus state of an image obtained by the optical system, and a second focus state detector having detecting accuracy higher than the detecting accuracy of the first focus state detector, the lens apparatus including:

a lens holding member holding the focusing lens;

a supporting member for supporting the lens holding member movably in the direction of an optical axis of the optical system;

a first drive mechanism for moving the supporting member in the direction of the optical axis of the optical system;

a second drive mechanism for moving the lens holding member in the direction of the optical axis; and a controller for controlling the first drive mechanism and the second drive mechanism on the basis of the results of detection by the first focus state detector and the second focus state detector;

wherein the driving accuracy of said second drive mechanism is higher than the driving accuracy of said first drive mechanism, the driving range of said first drive mechanism is greater than the driving range of said second drive mechanism; and wherein if said lens holding member is not at a predetermined position in said supporting member, said controller moves said lens holding member to the predetermined position in said supporting member by said second drive mechanism, detects the focus state by said first focus state detector and moves the supporting member in the direction of said optical axis by said first drive mechanism on the basis of the result of the detection until a defocus amount comes within a first focus range, and thereafter detects the focus state by the second focus state detector and moves the lens holding member in the direction of the optical axis by the second drive mechanism on the basis of the result of the detection until the defocus amount comes within a second focus range.

6. A lens apparatus according to claim 5 wherein the optical system has a single focusing lens.

7. A camera system including a lens apparatus including an optical system having a focusing lens, and a camera detachably mounting the lens apparatus thereon, the camera system including:
- a lens holding member holding the focusing lens;
- a supporting member for supporting the lens holding member movably in the direction of an optical axis of the optical system;
- a first drive mechanism for moving the supporting member in the direction of the optical axis of the optical system;
- a second drive mechanism for moving the lens holding member in the direction of the optical axis;
- a first focus state detector for detecting a focus state of an image obtained by the optical system;
- a second focus state detector for detecting the focus state of the image obtained by the optical system, the detection accuracy of the second focus state detector being higher (finer) than the detection accuracy of the first focus state detector; and
- a controller for controlling the first drive mechanism and the second drive mechanism on the basis of the results of detection by the first focus state detector and the second focus state detector;

wherein the driving accuracy of said second drive mechanism is higher (finer) than the driving accuracy of said first drive mechanism, the driving range of said first drive mechanism is greater than the driving range of said second drive mechanism, and wherein if said lens holding member is not at a predetermined position in said supporting member, said controller moves said lens holding member to the predetermined position in said supporting member by said second drive mechanism, detects the focus state by said first focus state detector and moves the supporting member in the direction of said optical axis by said first drive mechanism on the basis of the result of the detection until a defocus amount comes within a first focus range, and thereafter detects the focus state by said second focus state detector and moves the lens holding member in the direction of the optical axis by the second drive mechanism on the basis of the result of the detection until the defocus amount comes within a second focus range.

8. A camera system according to claim 7 wherein the optical system has a single focusing lens.

* * * * *